July 9, 1940. JEAN-BAPTISTE P. VAU 2,207,041
BRAKE-CONTROL DEVICE FOR MOTOR VEHICLES
Filed March 8, 1935 5 Sheets-Sheet 2

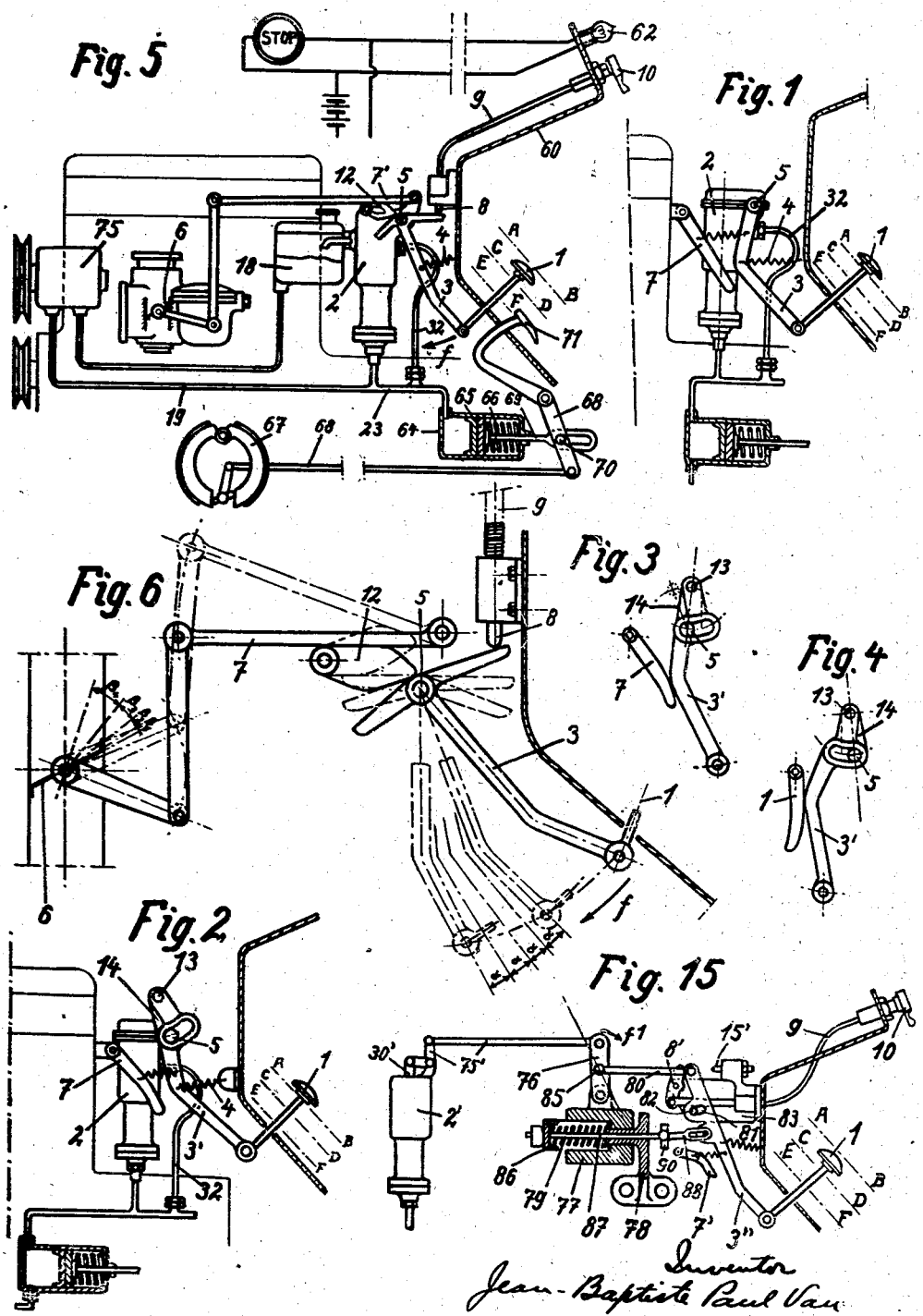

Inventor
Jean-Baptiste Paul Vau
By Pennie Davis Marvin Edmonds
attys

July 9, 1940. JEAN-BAPTISTE P. VAU 2,207,041
BRAKE-CONTROL DEVICE FOR MOTOR VEHICLES
Filed March 8, 1935 5 Sheets-Sheet 3
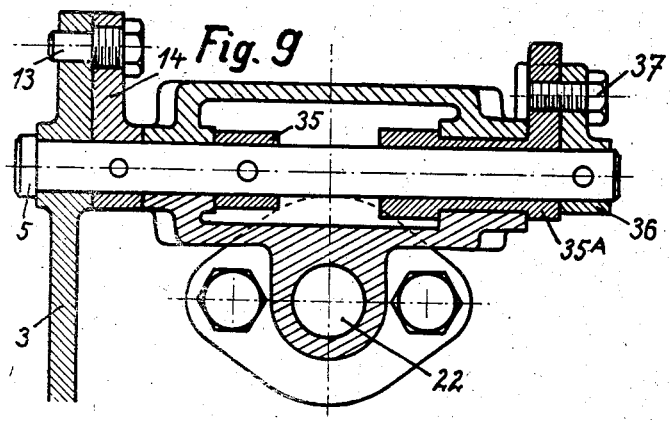
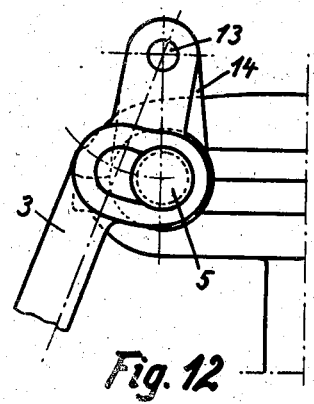
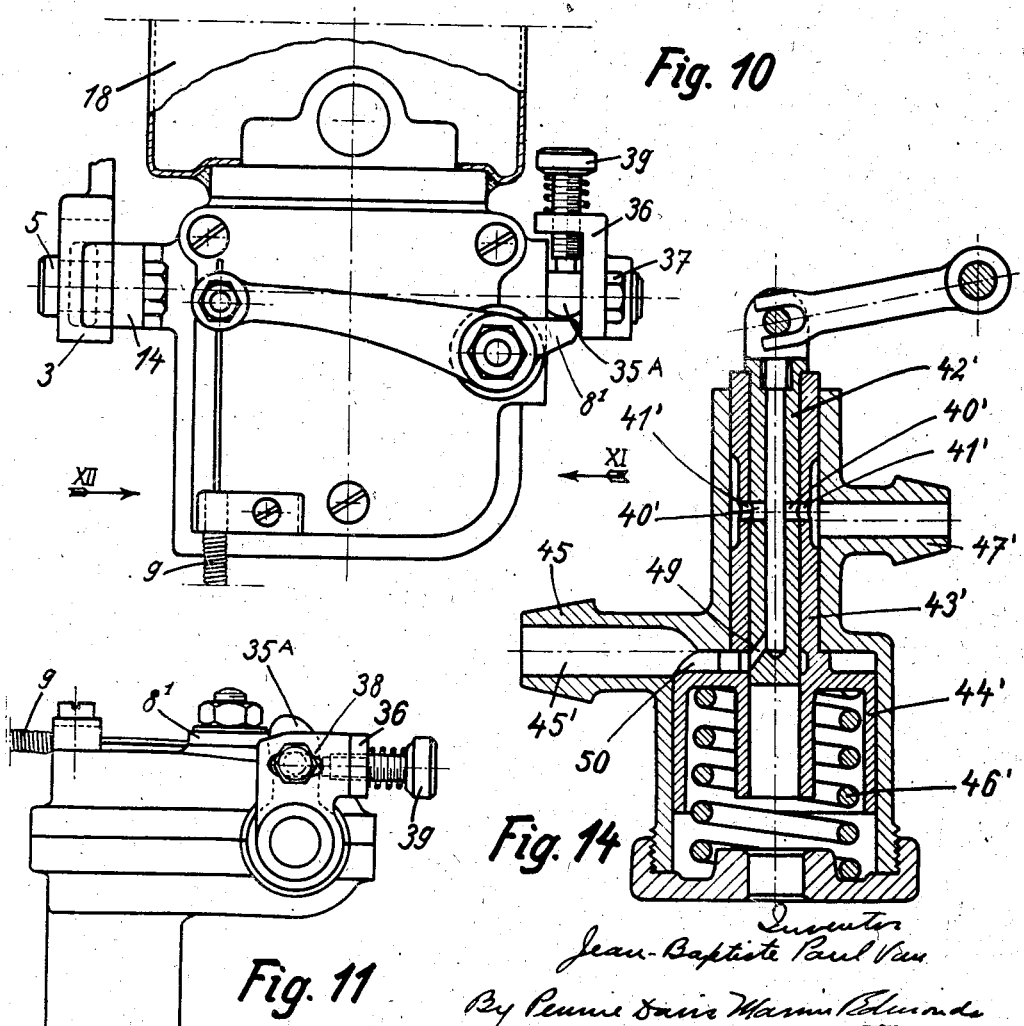
Inventor
Jean-Baptiste Paul Vau
By Pennie Davis Marvin Edmonds
Attys

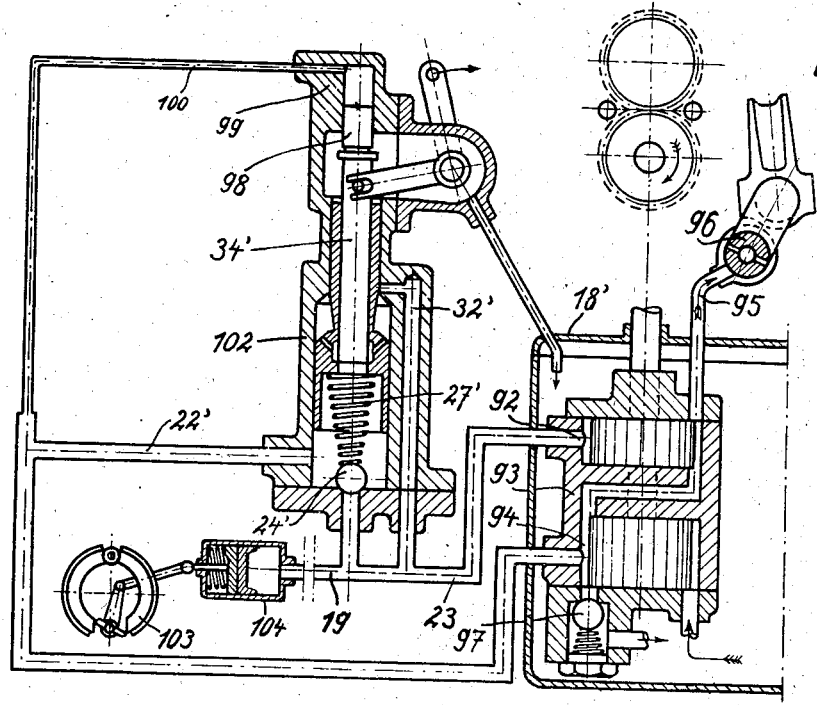
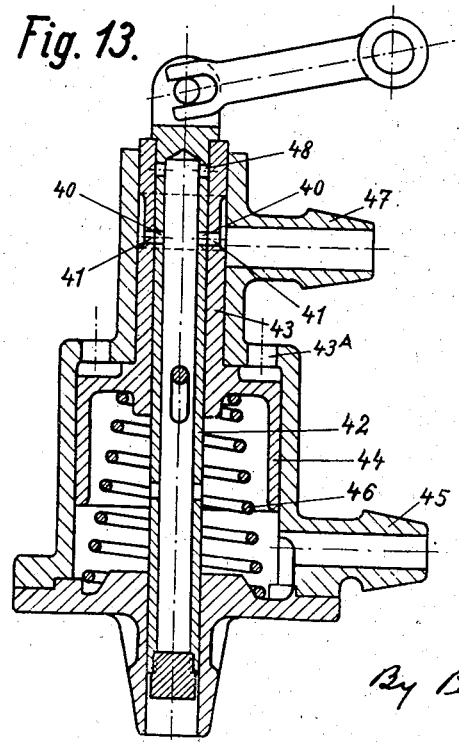

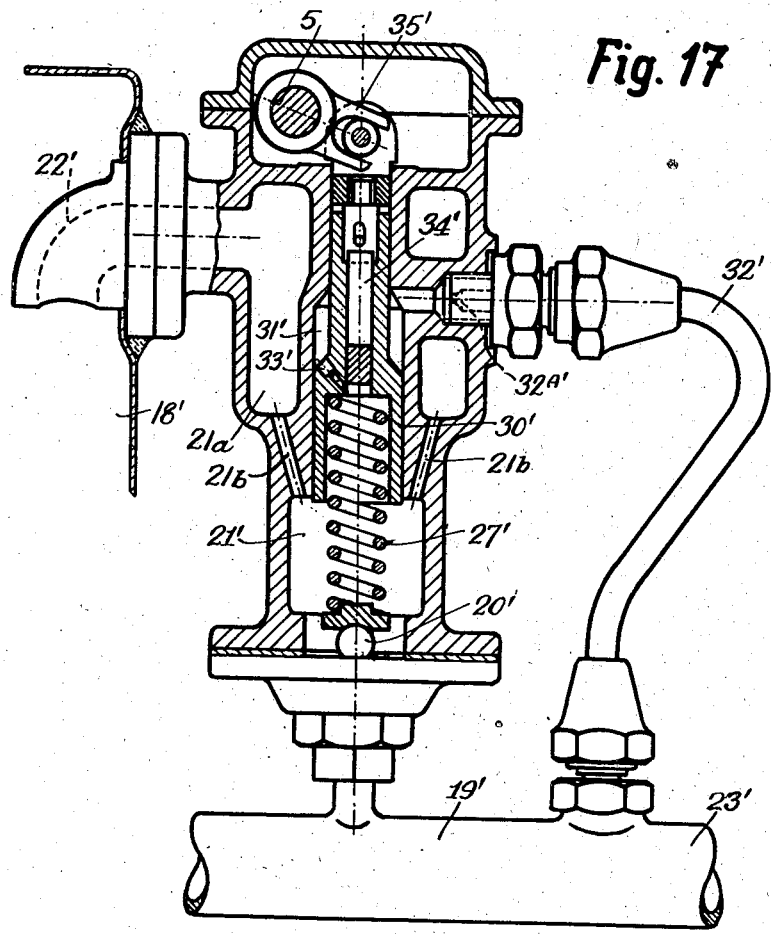
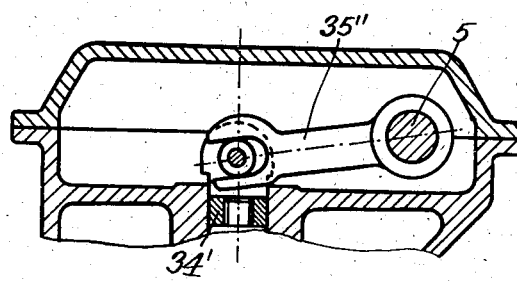

Patented July 9, 1940

2,207,041

UNITED STATES PATENT OFFICE 2,207,041

BRAKE-CONTROL DEVICE FOR MOTOR VEHICLES

Jean Baptiste Paul Vau, Saint-Ouen, France

Application March 8, 1935, Serial No. 9,988
In France March 8, 1934

3 Claims. (Cl. 192—3)

The object of my invention is to provide a new control device for the brakes of motor vehicles, and especially for wheel brakes. Hitherto, the brake control has been effected by means of a pedal which is subject to a force tending to bring it into the position in which the brakes are released, and the operating of the pedal requires a muscular effort on the part of the driver. The purpose of my invention is to provide on the contrary a brake control device such that the driver is not required to exert any muscular effort for the braking action, but he is indeed required to exert a resisting force in order to prevent the braking action. For this purpose, and this is the fundamental characteristic of the present invention, the brake-control pedal is constantly subjected to a force which tends to bring it into the position of maximum braking, and hence this force must be opposed by a resisting muscular action of the driver, in order to reduce or to eliminate the braking action. The principal result of this arrangement consists in the fact that if the pedal should be released for any reason, the brakes will act to the maximum degree, and the vehicle will be slowed up or stopped.

Obviously, as the pedal will be moved in the braking direction without requiring any muscular effort on the part of the driver, the braking power is produced by a suitable servo-motor the operation of which is controlled by the said pedal. The servo-motor may be for instance mechanical, hydraulic, electric, or may operate by a vacuum or by compressed air or other gas.

A control device of this kind may be used alone upon the vehicle, with the sole addition of the usual emergency brake, and in this case it is so arranged as to provide the maximum braking power which may be required, or on the contrary, and this is another feature of the invention, it may be so constructed as to provide only a limited servo-brake effect, and the maximum braking power is obtained by the addition of a muscular action upon another brake-control member, or of another braking system. In all cases, it is preferable, this being another feature of the invention, that the brake control device be combined with means chiefly comprising a device within reach of the driver, by which he can regulate at will the value of the maximum force of the servo-brake action, or may even dispense with all braking effort, for instance by varying the rest position of the pedal.

The said control device provides for an advantageous use of a common pedal for controlling the acceleration and the braking, and herein, the braking is effected by the movement of the pedal, starting from a given position or a neutral position, under the action of the said antagonistic force, into the braking position, the device for the quantitative regulating of the fuel mixture supplied to the engine being controlled by the movement of the same pedal in the opposite direction, starting from the said neutral position.

In this case, in order to assure the desirable progressive change from the braking to the acceleration, or inversely, while maintaining, for the pedal, a total stroke compatible with the normal movement of the foot, it is preferable, and chiefly with the known throttle carburetters, to construct the control of the acceleration in such way that the angular movement of the throttle in the direction of its opening, for a given fraction of the stroke of the pedal, will be small when the pedal is near its neutral position and will rapidly become much greater for an equal fraction of said stroke as the pedal moves away from said neutral position.

The accompanying drawings show by way of example various embodiments of the said invention as above set forth, as well as of the aforesaid and other features which will be more fully pointed out in the claims, and also various forms of construction of control devices adapted to produce the power required to apply the brakes.

Fig. 1 is a diagrammatic view which shows, on the chassis of a motor vehicle, a form of construction of a control device in which a common pedal serves to control the accelerating and the braking.

Fig. 2 is a like view showing another constructional form of the control device, and Figs. 3 and 4 show the controlling levers in various characteristic positions.

Fig. 5, which is similar to Figs. 1 and 2, shows another form of the control device.

Fig. 6 is a view on a larger scale of the transmission having a varying gear ratio between the pedal and the mixture throttle.

Figure 7:
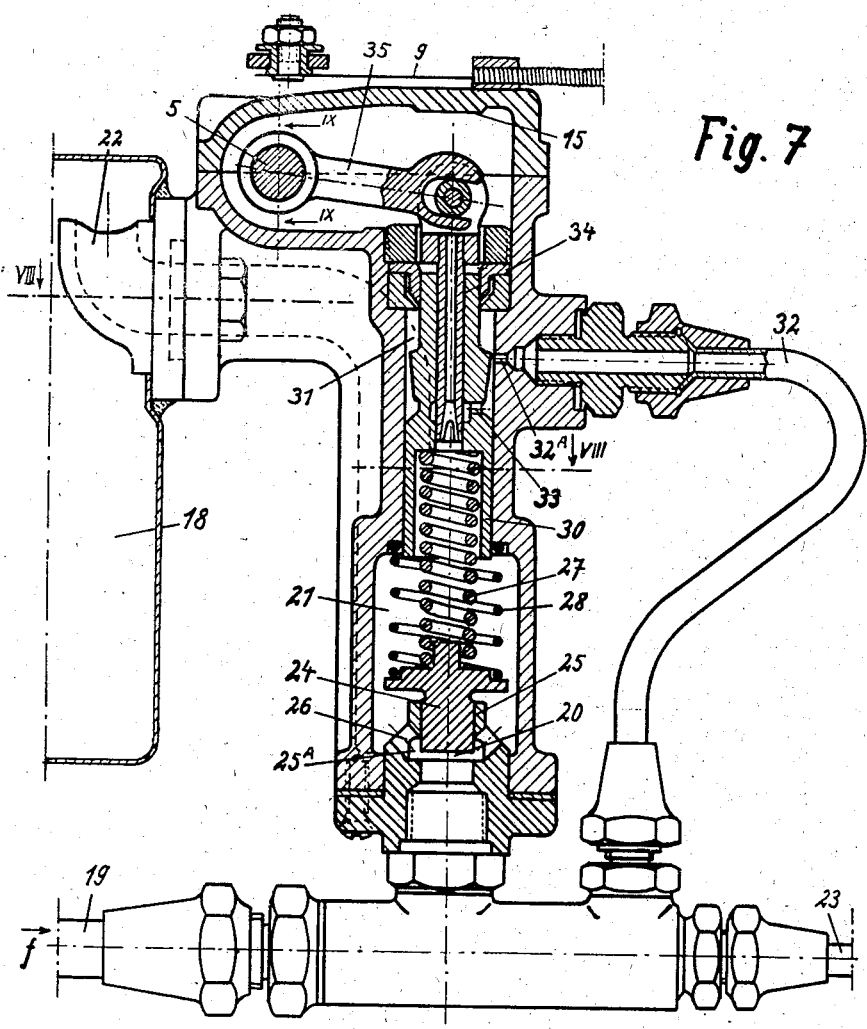
Figure 8:
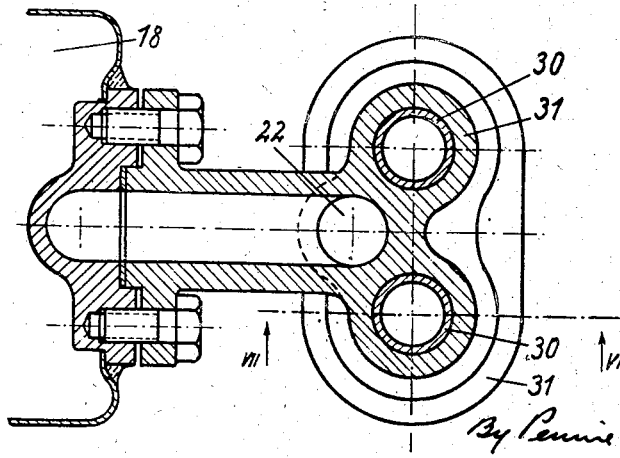

Fig. 7 shows the construction of a hydraulic control device, this being represented in section on the line VII—VII of Fig. 8, the parts being in the braking position.

Fig. 8 is a cross-section on the broken line VIII—VIII of Fig. 7.

Fig. 9 is another section on the line IX—IX of Fig. 7.

Fig. 10 is an external plan view of the control device with parts broken away.

Figs. 11 and 12 are corresponding end views, these being viewed respectively in the direction of the arrows XI and XII of Fig. 10.

Fig. 13 is a sectional view of a form of construction of a control device of the vacuum type.

Fig. 14 shows a constructional form of control device of the compressed air type.

Fig. 15 is a diagrammatic view analogous to Fig. 5 but showing another embodiment of the means of control of the control device operation.

Fig. 16 is an embodiment of the invention comprising a control device of the hydraulic type combined with the lubricating means of the engine.

Fig. 17 is a vertical section of the hydraulic control device shown in Fig. 1, and Fig. 18 is a partial vertical section of the hydraulic control device illustrated in Figs. 2 and 5.

In the following description with reference to the drawings of various embodiments of my invention, the same reference numerals denote the same parts throughout the description and the various illustrations. Thus 1 indicates the brake pedal located within reach of the driver's foot and controlling a control valve of a servo-motor adapted to apply the brakes. The control valve is designated as a whole by the reference numeral 2, and different embodiments of control valves more particularly convenient for the purpose will be described hereafter, the same forming also part of my invention.

Figs. 1 and 5 diagrammatically show a very simple embodiment of my invention. In this embodiment the brake pedal 1 is operatively connected with the control valve 2 through a link 3 at one end of which the pedal 1 is pivoted and which is keyed at its other end on a rotatable shaft 5 adapted to control the operation of the control valve 2. The pedal is shown in its rest position to which it is constantly urged by a convenient force such as that of a spring 4 and in accordance with my invention the connection between the pedal 1 and the control valve 2 is so arranged that, when the pedal is in its rest position, the servo-motor will be in a state corresponding to the maximum braking power which it is able to supply. When the pedal 1 is pushed down, starting from its rest position represented, this will cause, by means of the link 3 and the shaft 5, a decrease and then an annulment of the braking power, the total stroke of the pedal for this purpose being equal to the distance between the lines AB and CD. Inversely, when the pedal is allowed to move from CD to AB under the effect of the spring 4, this will cause an increasing braking action to be set up.

Further in the embodiment shown in Fig. 1, the brake pedal 1 also serves as a control member of the engine running and therefore is operatively connected to the device 6 which controls the admission of fuel to the engine, the connection being of the lost motion type, so that the said device will only begin to be actuated when the pedal 1 is pushed down below the neutral line CD. For this purpose, the link 3 engages at this time a pivoted lever 7 which is connected with the device 6 by a rod-and-link gear or like arrangement, and the movement of the lever 7 will continue until the pedal has been pushed down as far as the line EF, which represents with AB the extreme limits of its stroke. In short, the fraction of the stroke of the pedal between AB and CD corresponds to the braking, and that between CD and EF, to the engine running control.

Fig. 5 further shows an embodiment of a gearing with gradually variable ratio between the pedal and the throttle 6 for the control of the carbureted mixture supplied to the engine. In this construction, the angular movements of the lever 3 are imparted to the lever 7 by a pivoting cam 12 whose outline is such that equal angular movements $\alpha$ of the lever 3 in the direction $f$ will give rise to unequal and increasing angular movements $\beta_1$, $\beta_2$, $\beta_3$, $\beta_4$, of the throttle 6, as shown in Fig. 6.

In the aforesaid controlling devices, the movement of the pedal between CD and EF for the control of the throttle 6 causes at the same time a movement of the shaft 5 which controls the control valve 2. It may be desirable to prevent this movement of the shaft 5, principally with a view of reducing the wear, and Figs. 2 to 4 and 7 to 12 show a particular arrangement designed to suit this purpose. Herein the rotatable shaft 5 adapted to control the operation of the servo-motor is engaged in a guideway carried by the link 3' which is pivoted at 13 to a crank 14, keyed to the shaft 5. When the shaft 5 is free to rotate, the link 3' and the crank 14 will turn together with the shaft 5 which is moved through the crank 14 by the action of the spring 4, which takes place when the link 3' begins to move from its rest position shown in Fig. 2. In Fig. 3, the link 3' is shown in the position corresponding to the neutral position of the pedal 1. At this time, at which the braking action ceases, a stop, not shown, is engaged by the shaft 5 so as to prevent the latter from turning farther. As the crank 14 is thus held fast, the pivot joint 13 is now stationary and the link 3' will now turn about this pivot joint as a centre, while at the same time the shaft 5 slides in the guideway of the link 3'. When moving from the position shown in Fig. 3 to the extreme position shown in Fig. 4, and inversely, the link 3' will actuate the lever 7 and hence the throttle 6 without moving in any way the member 5 controlling the control valve 2.

Fig. 5 further shows a device by which the driver may vary from his seat the value of the maximum brake applying force which the servo-motor may be allowed to supply. Herein, this device consists of an adjustable stop 8 upon which a member movable with the lever 3 is pressed by the spring 4 when the pedal is released, and hence by varying the position of said stop 8 one will vary the rest posititon of the lever 3 and thus the value of the maximum power of the braking action. A cable 9 and a handle 10 mounted upon the dashboard 60 of the vehicle are herein provided in order to allow the driver to adjust the position of said stop 8 from his seat. It is obvious that this device or any other of a like nature may be used not only in the case of Fig. 5, but also with any other construction of the brake-control device, for instance the ones shown in Figs. 1 to 4, and Figs. 7 to 12 show an embodiment of such a device for varying the maximum braking power allowed, in the case of the brake control device shown in Figs. 2 to 4. In this embodiment the adjustable stop consists in a lever 8' pivoted on the control valve casing and actuatable by means of a cable 9. The lever 8' projects in the path of a crank 35a tied to the shaft 5 to rotate therewith so that engagement of this crank 35a with the stop 8' determines the rest position of the shaft 5 and of the brake pedal 1, and hence the maximum braking power that the servo-motor is allowed to supply.

When one and the same pedal is adapted both to control the brakes and the engine running, as shown for instance in Fig. 5, it may be advisable to provide on the dashboard 60 of the vehicle a visual indicator 62 operatively connected to the brake control device in a known manner in order to show the driver whether he actually controls the engine running or the brakes. This arrangement is of particular interest when it is desired to drive with the engine running quite slowly so that the pedal must be held quite near its neutral position (line CD in Fig. 5).

Fig. 5 further shows the combination of the brake control device according to my invention with another brake actuating device of a normal type which may be used as emergency brake control device or to produce a greater brake applying force than does the servo-motor if the latter has been adjusted to supply only a moderate brake applying force adapted to slow the vehicle but not to stop it in the shortest lapse of time. In the embodiment illustrated of an arrangement for this purpose the control valve 2 is of the hydraulic type and the liquid under pressure flows through a pipe 23 into a cylinder 64 in which a piston 65 is adapted to work and is urged by a spring 66 against the action upon it of the fluid pressure. The brakes 67 illustrated being of the mechanical type, i. e., actuated by means of members such as cables or linkage 68, the piston rod 69 is pivotally connected at 70 to the linkage 68 and the latter is also connected to a pedal 71. With this arrangement, the brakes 67 may be applied by the servo-motor through the medium of the piston 64 and by the pedal 71. In this case, it is preferable that the connection between the piston rod 69 and the linkage 68 be a lost-motion one, as shown, so arranged that the pedal 71 may be actuated without moving the piston 65.

Referring now to Fig. 15, I will describe an embodiment of a device for automatically limiting the brake applying force supplied by the servo-motor to a maximum value in dependence on the braking action on the vehicle running, i. e., on the negative acceleration or retardation of the vehicle. In the embodiment illustrated, the control valve 2' is provided with a movable member 30', the displacement of which controls the operation of the control valve and this member 30' is connected by a convenient linkage 75' or otherwise to a lever 76 pivoted on a weight 77 carried by a fixed bracket 78 and slidable thereon in a horizontal direction and longitudinally of the vehicle, or substantially so. A spring 79 urges backward the movable weight 77 to a rest position and a rod 80 connects the lever 76 to one end of a link 3" similar to the link 3' described with reference to Fig. 2 to 4. In a slot 81 carried by the link 3" is engaged a stationary stud 82 carried by a bracket 83. The same carries also a stop 15', preferably adjustable, provided on one side of the link 3" in the path of the latter and another stop 8' provided on the other side of the link 3" and adjustable by the driver from its seat by means of the cable 9' and the control member 10' on the dashboard.

In the rest position of the device the link 3" is in the position shown in Fig. 15, the brakes being applied. When the driver presses the pedal 1, the link 3" will pivot about the stud 82 and thus move the member 30' through the rod 80, the lever 76 and the linkage 75' until it engages the stop 15'. At this time the brakes are fully released and it will pivot about the stop 15' while the stud 82 slides in the slot 81 and will actuate the lever 7' controlling the engine running as already described with reference to the embodiment shown in Figs. 2 to 4. If the retardation of the vehicle is greater than the acceleration that the spring 79 is able to give to the movable weight 77, the latter will be moved forward against the spring 79 and thus will cause the lever 76 to somewhat pivot about its pivotal connection 85 to the rod 80 in the direction $f_1$ corresponding to a release of the brakes.

The device just described is preferably completed by the provision of means 86 enabling to adjust the tension of the spring 79. Said means consists herein in a nut adapted to be screwed on a rod 87 slidable in the bracket 78 and tied by a crank 88 to the link 3". With this arrangement an adjustment of the position of the stop 8' which determines the maximum value of the brake applying force adapted to be supplied by the servo-motor causes at the same time an adjustment of the tension of the spring 79, an increased tension corresponding to an increased value of the brake applying force. There is preferably provided a stop 90 on the rod 87 to limit its stroke and the crank 88 is tied to the link 3" by a lost motion connection such as a stud engaged in a slot.

It will be noted that there might be provided an arrangement enabling the driver to directly adjust the tension of the spring 79, from his seat, independently of the position of the stop 8'.

Figs. 7 to 12 show a control valve more particularly adapted to that purpose of my invention of providing a brake control device affording a well determined and quite progressive brake applying force. The servo-motor controlled by this valve is of the type employing the pressure of a liquid, the variation of the pressure being produced by a variation of the section of a restricted portion, located on a closed circuit carrying a current of the said liquid which is discharged by a pump. At 18 is the tank for the liquid, from which a pump 75 (Fig. 5) withdraws the liquid and again returns it to the tank, in the direction of the arrow $f$, through the pipe 19, a restricted port 20 of variable section, the chamber 21 and the conduit 22, the pressure produced in the pipe 19 being transmitted directly to the brakes through the pipe 23 which is filled with liquid, or it may be employed to actuate any mechanism adapted to operate the brakes at a distance. The restricted port, which might consist of a valve and its seat, is formed in the present case by a piston 24 movable in a cylinder 25 comprising a lateral groove 25a whose lateral wall is pierced with apertures 26 connecting the interior of the cylinder with the chamber 21, which surrounds it at the exterior. When the piston moves, it will more or less open, or entirely close, the groove 25a communicating with the apertures 26.

The movement of the piston 24 takes place through the medium of a calibrated spring 27, which is an important feature, as it assures a practically constant pressure on the upstream side of the piston 24 for a given position of the latter, irrespectively of the output of the pump. A second spring 28 which is much weaker and has a fixed point of support is herein provided in order to still exert a certain pressure on the piston 24 when the spring 27 is entirely released, in order to assure an exact residual pressure in the pipe 19 when the pedal 1 is no longer in the braking position.

In order to compress the spring 27 more or less, use will be made, in this case, of an auxiliary servo-motor consisting of a piston 30, which is movable, against the spring 27, in a cylinder 31, which is connected, through a restricted port 32a, to a branch pipe 32 leading from the pipe 19—23. The discharge of the liquid from said cylinder 31, for instance through orifices 33 formed in the rod of the piston 30 in which is a central bore connected with the chamber 21, takes place through the orifices 33 whose total section greatly exceeds the section of the inlet orifice 32a, but which may be more or less covered by a closing device 34, for instance a rod which is slidable in the central bore of the piston 30 connected with the pedal 1 in such way that its position will depend upon the position of the latter; this connection is herein assured by a crank-arm 35 keyed to the shaft 5. The orifices 33 and the closing device 34 thus form a restricted port of variable section, at the exit of the cylinder 31.

The operation is as follows:

By construction, the section of the piston 24 acted upon by the pressure prevailing in the pipe 19 is less than the section of the piston 30 subjected to the action of the pressure prevailing in cylinder 31 and the spring 27 is entirely released when the various parts are in a position corresponding to a position of the pedal 1 included between the lines CD and EF. On the other hand, the section of the orifice 32a is such that, for the specified minimum output of the pump, the desired residual pressure in the pipes 19 and 23 will be obtained by the combined action of the restricted port 32a and 33, the main restricted port 20 being entirely closed. When the output of the pump increases, the pressure tends to increase in the pipes 19 and 23 but the piston 24 slightly rises, thus somewhat compressing the spring 28, and owing to the flexibility of the latter and to the rapid increase of the flow section of the narrow port 20 due to the rise of the piston 24, the value of this residual pressure will hardly vary.

The loss of pressure in the cylinder 31 will depend upon the ratio between the sections of the inlet and outlet orifices 33—32a. Before any action takes place on the control, the pressure in the cylinder 31 will thus be much below the upstream pressure in the pipes 19—23.

If the rod 34 is then pushed down so as to wholly or partially close the orifices 33, the great loss of pressure in the cylinder 31 is reduced, and if the closing is complete, this loss of pressure will entirely disappear. At this time, the pressure in the cylinder 31 will equal the pressure in the pipe 19. In any case, the pressure will increase in the cylinder 31, and by reason of the different sections of the pistons 24 and 30, the thrust on the piston 30 will predominate, so that the piston 24 which is driven by the piston 30 by means of the spring 27 will be entirely driven in, or will remain in this position thus closing the narrowed port 20. The piston 30 then continues to move forward, following the movement of the rod 34, and compresses the spring 27 until the orifices 33 come in front of the closing rod 34. Thus the discharge will again take place through the orifices 33, and due to the resulting loss of pressure, the pressure in the cylinder will no longer increase. The piston 30 will be held, by its own action, in such position as to automatically regulate the loss of pressure according to the pressure in the pipes 19—23. The pressure in the pipe 19 continues to increase, and thus at a given time, the thrust on the piston 24 will exceed the force of the springs 27—28 and the piston 24 will rise and allow the liquid to flow through the narrow opening. At this time, the pressure will no longer increase. A balance will thus be set up between the contrary thrusts on the pistons 24 and 30, the pressure in the pipe 19 being equal to the quotient of the tension of the spring 27 divided by the surface of the piston 24. The operation will be repeated, irrespectively of the position in which the rod 34 is placed, and each position will correspond to a well-defined value of the tension of the spring 27 and hence to the pressure in the pipes 19—23, which value is independent of the output of the pump.

When the rod 34 is moved in the contrary direction in order to uncover the orifices 33, this will cause a reduction of the pressure in the cylinder 31, and the piston 30 will move back under the pressure of the spring 27 which now expands. This will cause a corresponding reduction of the pressure in the pipes 19—23.

The control valves 2 of the embodiments illustrated respectively in Figs. 1, 2 and 5 are shown in section in Figs. 17 and 18 and it will be seen that only the shape given to some of the pieces and to the casing somewhat differ from the embodiment illustrated in Fig. 7 but that the general arrangement and operation of the device remain the same. For instance, the restricted port between the liquid supplying pipe 19' and the discharge chamber 21' consists herein in a ball-valve 20' loaded by the spring 27' the opposite end of which engages the piston 30' movable in a cylinder 31'. The return conduit 22' does not open directly in the chamber 21' but in a chamber 21a provided around the cylinder 31' and communicating with the chamber 21' through ducts 21b. The other parts are substantially the same as in Fig. 7 and carry the same but primed reference numerals.

It will be observed in Fig. 8 that the control device thus represented is of a double type, thus providing for the control of two sets of brakes in different conditions. It is possible, for instance, to provide a set of two front brakes and another set of rear brakes, or to place the front and rear brakes together on the same side of the vehicle. In this case, the two springs 27 will each have the necessary features. The two closing devices 34 are also controlled in such way that they will not have the same braking position at the same time, for instance by means of two crank-arms 35—35a (shown in Fig. 9) which are mounted on the shaft 5 but have an angular spacing. It is preferable to provide means for adjusting this angular spacing. For this purpose, the crank-arm 35a is herein loose on the shaft 5 and can be secured to the latter by means of a lever 36 secured to the said shaft 5 and to which the crank-arm 35a is connected on a bolt 37 which is movable in a slot 38 in the lever 36, and the adjustment is made after loosening the said bolt 37 by means of a screw 39 which is screwed into the said lever 36 and acts upon the crank-arm 35a.

In the control devices operating by vacuum and by compressed gas, as shown in Figs. 13 and 14, the variation of the braking power is also due to a variation of the pressure of a fluid, due to the variation of the section of a narrow port through which the fluid is obliged to pass. In these two cases as well, the value of the net power per unit of surface will depend upon the tension of the spring, which in turn will depend upon a movable piece urged by said spring and subjected to an antagonistic force which is proportional to the value of the power aforesaid, and the movement of said piece will vary the throttling section between two movable members, whose position depends, for the first member, upon the position of said movable piece, and for the second, upon the position of the pedal.

In Fig. 13, the narrow port consists of a set of orifices 40—41 formed respectively in two members 42—43, one of which is slidable on the other. One of these members, 42, is so connected with the pedal that its position will depend upon the position of the pedal; the position of the other member 43 depends upon the position of a piston 44 movable in a cylinder connected on one side of the piston with the atmosphere through ports 43a in the member 43, and on the other side, with the brakes through a conduit 45. This latter side is permanently connected with the orifices 40; the orifices 41 are permanently connected with a source of suction, such as the engine for instance, through a conduit 47. The piston 44 is urged in the contrary direction to the force of the vacuum by a calibrated spring 46, and suitable orifices 48 in the member 42 will afford a direct connection with the atmosphere, when the pedal 1 has passed over the line CD toward the line EF, for the face of the piston 44 which is subject to the vacuum.

Thus when the member 42 is driven in, owing to the brake pedal 1 being moved toward position AB in Fig. 1 this will first close the orifices 48, and then the orifices 40 will be brought into coincidence with the orifices 41, so that the suction will be transmitted from the conduit 47 to the conduit 45, and thence to the parts which are to be moved. At the same time, the piston 44 will move forward while compressing the spring 46 and it will follow the movement of the member 42. When this latter is held fast, the piston 42 will take a determined position of equilibrium, as the tension of the spring 46 will counterbalance the vacuum which varies considerably for a slight variation in the relative position of the orifices 40—41. Thus the braking power will depend entirely upon the position of the member 42, and hence upon the pedal 1.

The device shown in Fig. 14 resembles the one which is shown in Fig. 13, but, in this case, the conduit 47' is connected with a source of compressed air, and the conduit 45' is connected with the atmosphere through orifices 50 in the member 43', which also serve for the circulation of compressed air entering through the orifices 49 in the member 42'. The calibrated spring 46' is obviously so situated as to act against the force of the compressed air upon the piston 44'.

The operation of this device resembles that of the device shown in Fig. 13. In the inoperative position illustrated, i. e. when the pedal 1 is at C—D of Fig. 1 the rod 42' is raised and the orifices 50 are open and atmosphere pressure thus prevails in the pipe 45'. When the rod 42' is driven in, owing to the pedal 1 being moved from C—D towards A—B of Fig. 1, this will first stop off the connection between the orifices 50 and the atmosphere, and the orifices 49 then coincide with the orifices 50, so that the compressed air passing through the orifices 40'—41' will act in the pipe 45' and upon the piston 44', which descends and compresses the spring 46', and varies the throttling section at 40'—41', and hence the degree of expansion of the air when the member 42' is getting stationary. As in the preceding case, the piston 44' takes a position of equilibrium which depends entirely upon the position of the member 42'.

Referring now to Fig. 16, I will describe an embodiment of my invention comprising a servo-motor of the hydraulic type the liquid circuit of which is combined to the lubricating circuit of an internal combustion engine, this particular arrangement forming also part of my invention.

The arrangement of the control device 102 and its connection with the brakes 103 and with the servo-motor 104 are substantially the same as herein before described with however this modification that the valve member 24 in Fig. 7 herein consists in a ball 24' simply pressed by a spring 27' upon its seat and the pipe 32 consists in a bore 32' provided in the casing wall. In this embodiment the liquid supplying conduit is connected to the outlet 92 of the second stage of a two-stage pump 93. The outlet 94 of the first stage of the pump 93 is connected as usual to the second stage and also to the lubricating circuit 95 of the engine the crankshaft of which is shown at 96. Further the discharge pipe 22' for the liquid circulated through the control device is connected to the outlet 94 of the first stage of the pump. This outlet is further provided with a discharge valve 97 as usual. Besides the member 34' controlling the operation of the control device is provided at an end with a part 98 working as a piston in a cylinder 99 connected through a pipe 100 to the discharge side of the control device in order to equilibrate the member 34'.

As will be seen from the foregoing the second stage of the pump is inserted in a closed circuit branched in derivation on the engine lubricating circuit. Owing to this arrangement one and the same pump may be used to supply at the requisite pressures both the engine lubricating circuit and the servo-motor provided the output of the first stage of the pump is greater than that of the second stage.

It may be advantageous, as shown in Fig. 16, to wholly immerse the pump 93 within the supply of liquid contained in a reserve tank 18', which may be the engine crankcase of the vehicle.

What I claim is:

1. In combination in a motor vehicle provided with brakes, a lubricating pump, an internal combustion engine having its lubricating circuit serially connected to said pump, brake control means including an hydraulic servo-motor operatively connected to said brakes to be adapted to apply the latter, and a pump adapted to supply liquid to said servo-motor, said pump having a smaller output than the lubricating pump and being branched in derivation on said lubricating circuit.

2. In combination in a motor vehicle provided with brakes, a two stage pump the second stage of which is designed to have an output smaller than that of the first stage, an internal combustion engine having its lubricating circuit serially connected with the inlet and outlet of the first stage of said pump, brake control means including an hydraulic servo-motor operatively connected to said brakes to be adapted to apply the latter, and liquid conductive means connecting said servo-motor serially with the second stage of the pump.

3. In a motor vehicle provided with brakes, an engine adapted to drive the vehicle, control means of the engine running, a single pedal within reach of the driver and operative connections between said pedal and both the brakes and said control means so that the braking function will take place through one range of pedal movement and the control means operating function in another range and that, when the pedal is in its rest position, the brakes are applied and, when it is moved from said rest position in one direction, it first causes the brakes to be progressively released and thereafter actuates said control means, and vice-versa when moved back to said rest position, said operative connection between the pedal and the control means including means adapted to afford a variable leverage between said pedal and the control means in order that equal fractions of the corresponding pedal stroke correspond to increased displacements of said control means when the latter are actuated to speed up the engine.

JEAN BAPTISTE PAUL VAU.